United States Patent
Hyun et al.

(10) Patent No.: US 7,663,501 B2
(45) Date of Patent: Feb. 16, 2010

(54) APPARATUS AND METHOD OF CONTROLLING EMITTING COLOR OF VISIBLE LIGHT ACCORDING TO A CURRENT COMMUNICATION STATE IN A VLC DEVICE

(75) Inventors: Yoo Jeong Hyun, Seongnam-si (KR); Seong Hoon Hyun, legal representative, Sung Nam (KR); Yun-Je Oh, Yongin-si (KR); Dae-Kwang Jung, Suwon-si (KR); Hong-Seok Shin, Suwon-si (KR); Kyung-Woo Lee, Yongin-si (KR); Dong-Jae Shin, Seoul (KR); Sung-Bum Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 270 days.

(21) Appl. No.: 11/975,817

(22) Filed: Oct. 22, 2007

(65) Prior Publication Data
US 2008/0094244 A1    Apr. 24, 2008

(30) Foreign Application Priority Data
Oct. 20, 2006    (KR)    ................. 10-2006-0102595

(51) Int. Cl.
*G08B 5/00*    (2006.01)
*G08B 5/36*    (2006.01)
*H04N 5/253*    (2006.01)
*G09G 3/32*    (2006.01)

(52) U.S. Cl. ............. 340/815.65; 340/815.66; 340/815.67; 340/525; 340/691.6; 340/825.72; 340/815.6; 398/107; 362/800; 345/83

(58) Field of Classification Search ........... 340/815.66, 340/815.67
See application file for complete search history.

(56) References Cited

U.S. PATENT DOCUMENTS 6,897,624 B2 *    5/2005    Lys et al. .................. 315/297
6,985,069 B2 *    1/2006    Marmaropoulos .......... 340/3.9
7,583,901 B2 *    9/2009    Nakagawa et al. .......... 398/183

FOREIGN PATENT DOCUMENTS

KR    2006-117413    11/2006

* cited by examiner

*Primary Examiner*—Donnie L Crosland
(74) *Attorney, Agent, or Firm*—Cha & Reiter, LLC

(57) ABSTRACT

An apparatus and method for controlling the emitted color of visible light according to the current communication state in a visible light communication (VLC) device. The method includes storing one or more communication states and emitting colors that are correspondingly matched to the one or more communication states to indicate each of the various communication states. The VLC also checks, which can be based upon selection of a VLC mode, the current communication state and an emits a color that corresponds to the current communication state and emits the checked color of light to provide a visible light signal that indicates communication status to a user.

16 Claims, 4 Drawing Sheets

COMMUNICATION LINK ESTABLISHMENT STATE

DATA COMMUNICATION STATE

COMMUNICATION LINK RANGE DEVIATION STATE

APPARATUS AND METHOD OF CONTROLLING EMITTING COLOR OF VISIBLE LIGHT ACCORDING TO A CURRENT COMMUNICATION STATE IN A VLC DEVICE

CLAIM OF PRIORITY

This application claims priority under 35 U.S.C. § 119(a) from a Korean Patent Application entitled "Apparatus and Method of Controlling Emitting Colors of Visible Light According to Current Communication State in a Visible Light Communication Device", filed in the Korean Intellectual Property Office on Oct. 20, 2006 and assigned Serial No. 2006-102595, the contents of which are incorporated herein by reference in its entirety.

BACKGROUND OF THE INVENTION

1. Field of the Invention

The present invention relates generally to an apparatus and method of controlling emitting colors of a visible light emitting diode (LED). More particularly, the present invention relates to controlling the emitted colors according to a current communication state in a visible light communication (VLC) device.

2. Description of the Related Art

Due to the improved technological performance and reduced cost of light emitting diodes (LEDs) in recent years, such LEDs have rapidly proliferated in the fields of specialized lighting, such as lights used in portable devices, displays, automobiles, traffic lights, sign boards, etc., and so on. In particular, LEDs are also becoming increasingly popular for use as camera flashes, as well as portable flashes for mobile phones or personal digital assistants (PDAs), backlight units for LCDs, and other applications. More recently, due to radio frequency (RF) band depletion, and the collision probability of different wireless communication technologies, as well as the emergence of ultra high-speed ubiquitous communication environments in a 4 G wireless technology, concerns about the optical wireless communication technology being used in a complementary system along with RF communication technology has increased. Thus, the research and development of optical wireless communication technology using LEDs is being extensively conducted by a number of companies and research institutions.

There have been a number of studies of peripheral interfaces enabling communication from one device to another using an infrared data association (IrDA) module mounted on portable devices such as a mobile phone or PDA, a small-sized home appliance such as a digital camera or MP3 player, and so on. Due to such studies, a variety of products associated with such peripheral interfaces have been developed and commercialized. The optical wireless communication technology including infrared communication offers several advantages such as non-congestion between different devices, ensured communication security, low implementation cost, and so on, which is an improvement over radio frequency (RF) communications such as Bluetooth or Zig-Bee. In order to implement optical communication, LEDs can be advantageously used instead of IrDa modules because of technological merits and better cost effectiveness, when compared with IrDA modules.

One of the advantages of visible light communication using a visible LED as a peripheral interface is that an LED module which is pre-mounted on a mobile terminal or PDA can be utilized without the need to install additional modules. In addition, the use of the LED module facilitates pointing between transceiver modules or devices., Additionally, a more aesthetic appearance is presented by the LED module, and when compared to IR communication, has been shown to have better results capturing a consumer's attention.

Visible light communication in general normally employs data communication schemes using blinking light signals and/or different colors light signals to facilitate the communication. That is to say, communication between visible light communication devices is performed via at least one of blinking or color control of light signals.

With reference to FIG. 1, a visible light communication (VLC) device 100 transmits desired data to a counterpart VLC device 102 through a visible light signal (referred to as 110 in FIG. 1) by driving a visible LED. The VLC device 102, which employs a camera to serve as a receiver for receiving a visible light signal, analyzes visible light signals received through the camera and communicates with the VLC device 100.

One of the drawbacks of communication between VLC devices is that a user has difficulty in directly checking the current communication state of the device, for example, to monitor items such as establishment of a communication link, progress of data communication, or receive feedback about the stability of the communication link established depending on position or angle between mobile terminals.

In addition, with regard to conventional VLC technology, light of the same color as that emitted during data transmission is emitted from an LED of the VLC device, even during an initialization procedure such as detection of VLC devices, negotiation after the detection, and the like. Furthermore, even when a communication link established between the two VLC devices is disconnected in the course of data transmission, a user cannot identify the disconnection.

SUMMARY OF THE INVENTION

The present invention, as shown in the examples herein below, was made in part to address at least some of the aforementioned problems with VLC and/or disadvantages with VLC, and provides at least the advantages described herein below. Accordingly, an exemplary aspect of the present invention provides an apparatus and method of allowing a user to directly identify a current communication state in a visible light communication (VLC) device.

In an exemplary embodiment, the present invention provides a wireless visible light communication (VLC) device using a visible light emitting diode (LED), in which a user is allowed to easily identify the establishment of a communication link by controlling an emitting color of the visible LED.

In another exemplary embodiment, the present invention provides a method of establishing a normal communication link by locating a transmitter and a receiver in available communication link coverage.

Accordingly, an exemplary embodiment of the present invention provides an apparatus for controlling an emission of colors of visible light according to a current communication state in a visible light communication (VLC) device. The apparatus comprises a memory for storing data identifying one or more communication states and associated emitting colors that are correspondingly matched to the one or more communication states to indicate each communication state, a pulse generator for generating a pulse signal corresponding to data to be transmitted, a modulator for modulating a received pulse signal into a signal suitable for optical wireless communication, a VLC transmitter for outputting a visible light signal of the corresponding emitting color based on a color control signal and a controller for checking, upon selection of VLC mode, current communication state; and an emitting color corresponding to the current communication state from the memory and providing the VLC transmitter with the color control signal to output a visible light signal whose color depends on the checked current state.

According to another exemplary embodiment of the present invention, there is provided a method of controlling an emitting color of visible light according to the current communication state in a visible light communication (VLC) device, which includes a VLC transmitter. The method comprises the steps of storing one or more communication states and emitting colors that are correspondingly matched to the one or more communication states to indicate each communication states, checking, upon selection of VLC mode, current communication state and emitting a color corresponding to the current communication state, and emitting the checked color of light as a visible light signal for communication.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Figure 1:
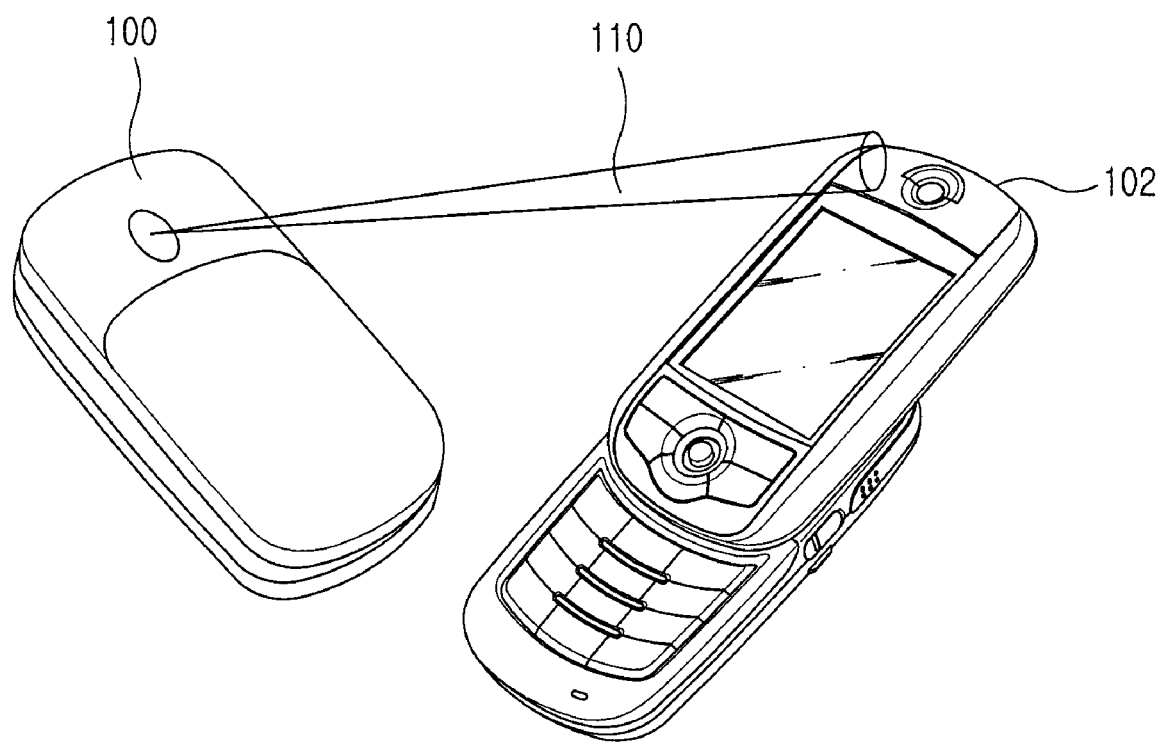
FIG. 1 is an example illustrating a visible light signal transmitted/received between visible light communication (VLC) devices according to one example of the present invention.

Several preferred exemplary embodiments of the present invention will now be described in detail with reference to the annexed drawings. It is to be understood that the drawings are presented for purposes of illustration and not for limitation. Furthermore, examples of VLC light devices and methods according to the present invention which are depicted in the drawings are not the only means by which the invention can be practiced. In the drawings, the same or similar elements are denoted by the same reference numerals even though they are depicted in different drawings. In the following description, a detailed description of known functions and configurations incorporated herein has been omitted for conciseness so as not to obscure the invention.

The present invention is directed to a wireless visible light communication (VLC) device using a visible light emitting diode (LED), in which a user is allowed to easily identify the establishment of a communication link by controlling an emitting color of the visible LED. In addition, the present invention provides a method of establishing a normal communication link by locating a transmitter and a receiver in available communication link coverage.

Figure 2:
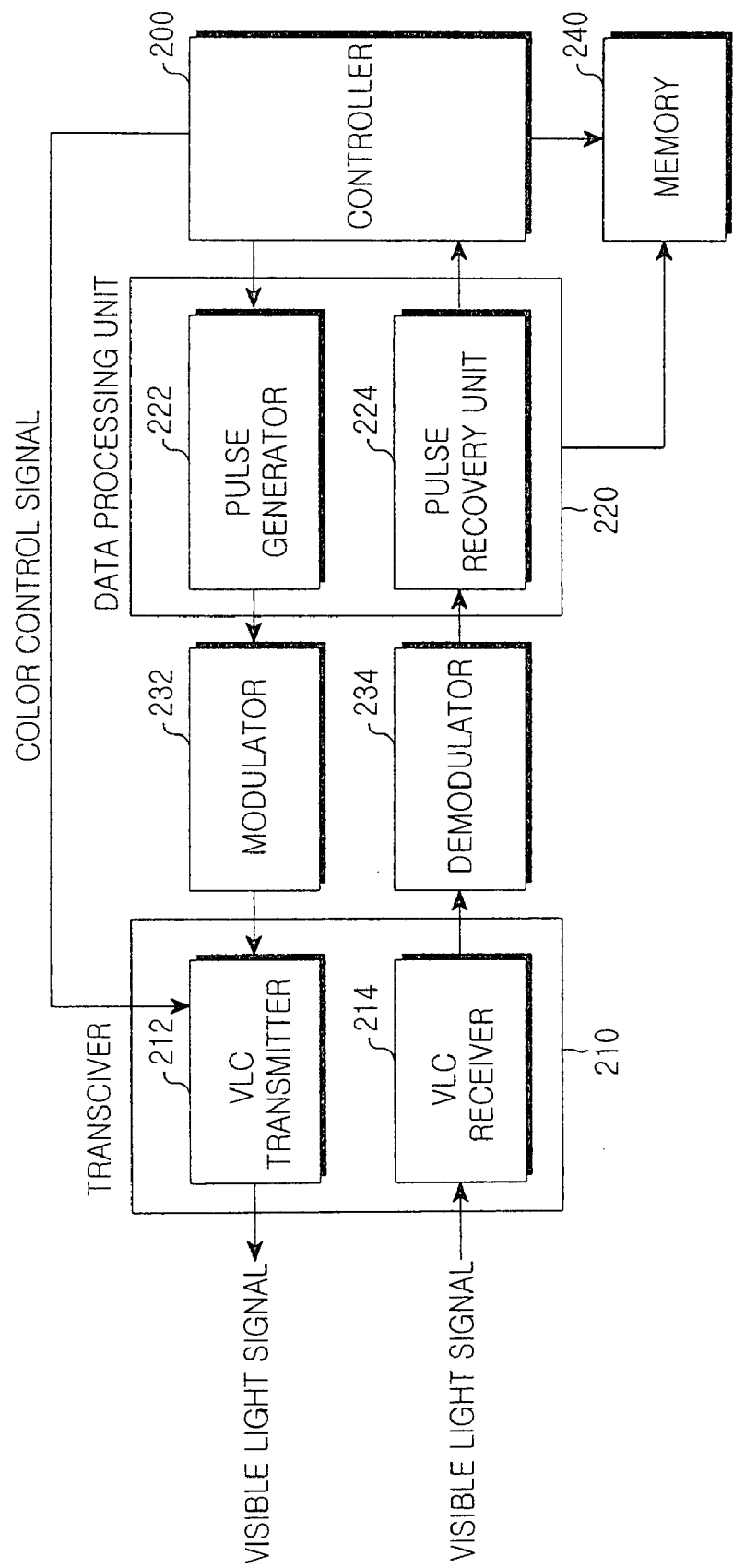
FIG. 2 is a diagram illustrating internal structure of a VLC device according to an exemplary embodiment of the present invention.

Referring to FIG. 2, a description will be made of the internal structure of a VLC device for notifying a user of a current communication state by controlling the emitting color of a visible LED according to an exemplary embodiment of the present invention. The VLC device includes a VLC transmitter 212, a VLC receiver 214, a pulse generator 222 for pulse shaping operation, a pulse recovery unit 224, a modulator 232, a demodulator 234, a controller 200 and a memory 240. Although in this exemplary embodiment, the VLC device comprises both the VLC transmitter 212 and the VLC receiver 214, it is to be understood that a VLC device used only for transmission may not include the VLC receiver 214. Similarly, a VLC device only used for reception may not include the VLC transmitter 212.

The controller 200 controls the overall operation of the VLC device. For example, if the VLC device in a VLC mode has a current status in which a communication link is established, the controller 200 controls the VLC transmitter 212 to emit a first color as a visible light signal indicating there is an established link. Meanwhile, if the VLC device is in a data communication state, the controller 200 controls the VLC transmitter 212 to emit a second color different from the first color. Further, if the VLC device is in a deviating state as it is approaching a range limit for communications, the controller 200 controls the VLC transmitter 212 to emit a third color that is different from the first and second colors. It should be understood that the colors could be different shades of a visible color, a different intensity, etc.

Upon normal establishment of the communication link, as in a photo diode (PD) of the VLC receiver 214 being completely disposed on a photo image, there is typically received a predetermined intensity of light or more. However, when the VLC device deviates from the coverage range of the communication link, the photo diode (PD) of the VLC receiver 214 may be disposed around a boundary of the photo image, suggesting that there is a significant change in the intensity of light. In other words, light is intermittently received. In this case, the controller 200 detects instability of the established communication link through the VLC receiver 214 and transmits information regarding the instability of the established communication link to the VLC transmitter 212 to indicate that the VLC device currently is deviating from the coverage range of the communication link. It is also within the spirit of the invention and the scope of the appended claims that a signal other than a visible status, such as a tone, beep, vibration, etc., could be provided in addition to the visible status.

In this case, the first, second and third colors may be set one by one among various colors that can be emitted from the LED, and the third color may be set in combination with the first and second colors. The memory 240 stores data identifying one or more communication states and associated emitting colors for controlling the emitting colors to be output from the LED, i.e., respective emitting colors emitted which correspond to one or more communication states. The one or more communication states include a communication link establishment state, a data transmission state, and a communication link range deviation state.

The following is a detailed description of a data transmission operation in an example of the VLC device with continued reference to FIG. 2. First, the pulse generator 222 generates a pulse signal corresponding to data that is to be transmitted under control of the controller 200, and an output from the pulse generator 222 is provided to the input of modulator 232. The modulator 232 then modulates the received pulse signal and outputs a modulated signal suitable for optical wireless communications. The modulated output signal is input to the VLC transmitter 212. Here, the VLC transmitter 212 outputs a visible light signal of corresponding color defined by an emitting color control signal from the controller 200. The VLC transmitter 212 may be formed of a visible LED. LEDs are generally classified into infrared emitting diodes (IREDs) and visible light emitting diodes (VLEDs).

In the aforementioned exemplary embodiment of the present invention, a VLED is used for the VLC transmitter 212 in order to perform visible light communication. Currently, emitting colors available from the existing VLEDs are red, green, orange, and so on. In addition, the VLEDs can be assembled as a lamp to thereby serve as light sources in displays of various electronic products, traffic lights, sign boards, and so on.

Still referring to FIG. 2, the following detailed description describes data reception operation in a VLC device according to the present invention.

Upon reception of a visible light signal transmitted from a counterpart VLC device, the VLC receiver 214 converts the received visible light signal into an electrical signal and provides the converted visible light signal (electrical signal) to the demodulator 234. In this example, the VLC receiver 214 may be formed of a photo diode (PD) for converting external light into an electric signal. The demodulator 234 demodulates the electrical signal into data suitable for optical wireless communication and provides the demodulated data to the pulse recovery unit 224. Then, the pulse recovery unit 224 recovers a pulse signal from the input electric signal and provides the pulse-recovered signal to the controller 200.

Figure 3:
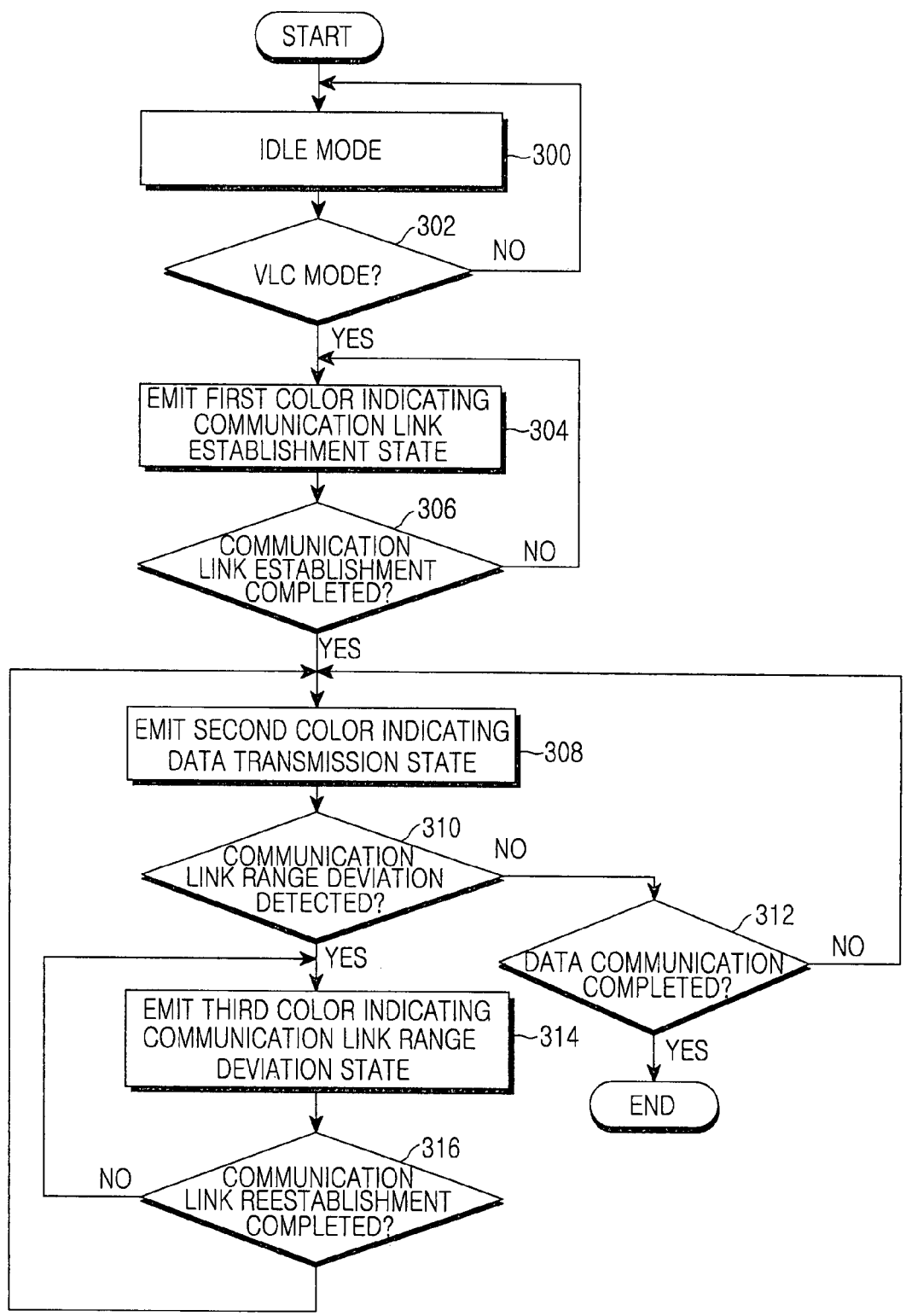
FIG. 3 is a flow chart showing a control process of an emitting color of a visible LED according to a current communication state of the VLC device according to an exemplary embodiment of the present invention.

Now referring to FIG. 3, the following detailed description describes an example of a control process for controlling an emitted color of the visible light signal output from the VLC device as shown in FIG. 2 according to the current communication state.

The controller 200 maintains an idle mode in step 300. If a current mode is switched to a VLC mode in step 302, then process then performs step 304 to output a control signal for controlling the emission of a first color by the VLC transmitter 212 that indicates that the status of the VLC device is that a communication link is being established. Here, the communication link establishment means a status where an initialization procedure, such as detection of VLC devices, followed by negotiation between the VLC devices, and the like, is performed. After receiving the control signal, the VLC transmitter 212 emits the first color of light. In other words, according to the present invention, the VLC transmitter 212 emits the first color of light whereby a user can determine that the status of the VLC device that a communication link is being established.

Then, when the process goes to step 306, the controller 200 checks (determines) whether or not the communication link establishment is complete. If the communication link establishment is complete, then step 308 is performed to emit a second color associated with the communication link establishment being complete, so as to indicate the current transmission status. If the communication link establishment is not complete, then step 304 is performed again. In this way, the controller 200 controls the VLC transmitter 212 to emit the first color of light.

After detecting the completion of the communication link establishment between VLC devices at step 306, the controller 200 then outputs a control signal for emitting a second color indicating the data transmission status (step 308). After receiving the control signal for emitting the second color, the VLC transmitter 212 emits the second color of light. That is, according to the present invention, the VLC transmitter 212 emits the second color of light whereby a user can determine that the VLC device is currently in a data transmission state.

Still referring to FIG. 3, at step 310, the controller 200 checks whether or not the VLC device is out of the allowed communication link range (deviation) in the course of data transmission. If the deviation is detected, the process proceeds to step 314, wherein a third color is emitted to indicate the communication link deviation state. Otherwise, the process proceeds to step 312 to check whether the data communication has been completed. If the data communication has been completed, the process ends. If the data communication has not been completed, the process proceeds back to step 308 to control the VLC transmitter 212 to emit the second color of light indicating the current data communication status in a continuous fashion. During the emission of the light in a continuous fashion, the controller may periodically continue to check upon the completion status. The periodic checking can be a predetermined intervals or at random intervals.

If the deviation is detected at step 310, the controller 200 outputs a control signal for emitting a third color light signal by the VLC transmitter 212 indicating the VLC device is out of the allowed communication link range(step 314). After receiving the control signal for emitting the third color, the VLC transmitter 212 transmits the third color of light. In other words, according to the present invention, the VLC transmitter 212 of the VLC device emits a third color of light, thereby enabling a user to determine that the VLC device currently is about to deviate from the coverage range of the communication link established between the VLC devices. Accordingly, the user may adjust the position of the VLC device for receiving data by positioning the VLC device within the allowed coverage range of the communication link.

As described above, according to the present invention, a user is allowed to directly determine the current communication state because the VLC device controls the emitted colors of light sources, which indicate the status of the VLC receiver, including the status of the communication link and the data transmission status between VLC devices utilizing visible light communication.

Figure 4A:
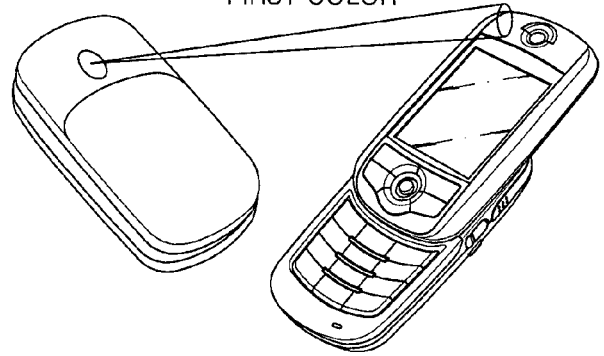
FIG. 4 is an example showing change of emitting color of a visible LED according to a current communication state of VLC devices according to an exemplary embodiment of the present invention.
Figure 4B:
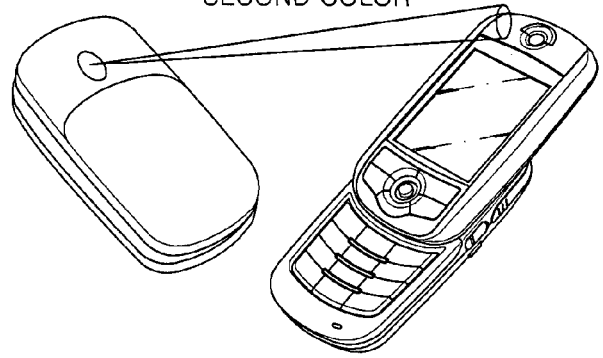
Figure 4C:
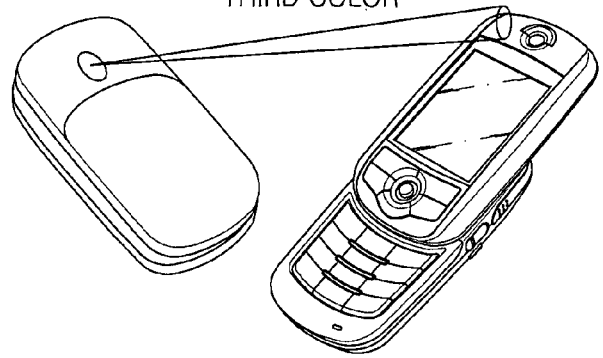

Finally, FIGS. 4A-4C depict the order of the colors and their associated status. As shown in FIG. 4A, the first color indicates the communication link establishment state. In other words, when the communication link is being established, the first color is transmitted. As shown in FIG. 4B, the second color emitted indicates the data communication status. Finally, in FIG. 4C, the communication link deviation status is shown.

While the present invention has been particularly shown and described with reference to particular exemplary embodiments thereof, those skilled in the art will appreciate that the disclosed exemplary embodiments of the invention are used in a generic and descriptive sense only for explanatory purposes, and not for purposes of limitation. In addition, the person of ordinary skill in the art understands and appreciates that various changes may be made and equivalents substituted for elements thereof without departing from the spirit of the invention and the scope of the appended claims as set forth herein below. For example, in addition to or in lieu of providing a visible communication status, the present invention can also be used to provide a visible operational status of the VLC, and there may be many other statuses other than the communication statuses shown and described that can be provided by the present invention.

Additionally, the controller may check the communication state of the VLC device, may determine the communication state of the VLC device, or may receive a signal that identifies the communication state of the VLC device, or the controller may poll a memory wherein the communication state is updated and retrieve a current status. Further, the deviation status can include displaying a particular emitting color and/or other warning if the communication link is broken or blocked, in addition to being close to and/or outside of a physical communication range.

What is claimed is:

1. An apparatus for controlling an emitted color of visible light in a visible light communication (VLC) device according to a current communication state, said apparatus comprising:
 a memory for storing data identifying one or more communication states and an associated plurality of emitting colors that are correspondingly matched to the one or more communication states to indicate each respective communication state;
 a pulse generator for generating a pulse signal corresponding to data to be transmitted;
 a modulator for modulating the pulse signal output from said pulse generator into a signal suitable for optical wireless communication;
 a VLC transmitter for outputting a visible light signal having a particular corresponding emitting color based on a color control signal; and
 a controller for determining a current communication state of the VLC device and an associated emitting color corresponding to the current communication state stored in the memory, and for providing the VLC transmitter with the color control signal to output a visible light signal having a particular corresponding emitting color based on the current communication state.

2. The apparatus of claim 1, wherein the VLC transmitter comprises a visible light emitting diode (LED) for VLC communication.

3. The apparatus of claim 1, wherein the communication state includes at least one of a communication link establishment state, a data transmission state, and a communication link range deviation state.

4. The apparatus of claim 2, wherein the communication state includes at least one of a communication link establishment state, a data transmission state, and a communication link range deviation state.

5. The apparatus according to claim 2, wherein the controller for determining a communication determines a status of the VLC device upon selection of a VLC mode.

6. The apparatus according to claim 5, wherein the controller for determining a communication state periodically checks a status of the communication link establishment state when the communication link establishment state is incomplete.

7. The apparatus according to claim 6, wherein the controller determines a communication state by checking a status updated in the memory.

8. The apparatus according to claim 6, wherein the controller checks a status updated in the memory at one of predetermined or random intervals.

9. The apparatus according to claim 6, wherein the controller receives a status of the communication state and compares the status with one or more communication states with a table stored in the memory.

10. The method according to claim 5, wherein step (e) is periodically performed at predetermined intervals while the third color is emitted in a continuous fashion.

11. A method of controlling an emitted color of visible light state in a visible light communication (VLC) device including a VLC transmitter according to a current communication, the method comprising the steps of:
 storing data identifying one or more communication states and a plurality of associated emitting colors that are correspondingly matched to the one or more communication states of the visible light communication (VLC) device;
 checking, when said VLC device is operating in a VLC mode, a current communication state and an associated emitting color of light corresponding to the current communication state; and
 emitting the associated color of light as a visible light signal for providing visible operational status of the VLC device.

12. The method of claim 11, wherein the communication states include determining at least one of a communication link establishment state, a data transmission state, and a communication link range deviation state.

13. The method of claim 12, wherein the step of storing one or more communication states and associated emitting colors that are correspondingly matched to the one or more communication states comprises the step of:
 storing data identifying emitting colors associated with a particular communication link establishment state, wherein a communication link establishment state is matched to a first emitting color, the data transmission state is matched to a emitting second color, and the communication link range deviation state is matched to a third emitting color.

14. The method of claim 13, wherein the step of checking, current communication state and an emitting color corresponding to the current communication state includes the steps of:
 (a) upon selection of a VLC mode, checking whether or not the current state of the VLC device is the communication link establishment state, and if the communication link has been established, emitting the first color;
 (b) checking whether or not the current state is the data transmission state and, if the state is the data transmission state, emitting the second color; and
 (c) checking whether or not the current state is the communication link range deviation state or not, and, if the state is the communication link range deviation state, emitting the third color.

15. The method of claim 14, further comprising the step of:
 (d) if the communication link establishment is completed during checking whether or not the current state is the communication link establishment state in step (a), emitting the second color.

16. The method of claim 14, further comprising the steps of:
 (e) if the current state is the communication link range deviation state, checking whether or not a communication link has been reestablished while emitting the third color; and
 (f) if the communication link reestablishment checked in step (e) is complete, emitting the second color, and if the communication link reestablishment is incomplete, emitting the third color in a continuous fashion.

* * * * *